(12) United States Patent
Hecht

(10) Patent No.: US 9,189,883 B1
(45) Date of Patent: Nov. 17, 2015

(54) RENDERING OF MULTIPLE VOLUMES

(71) Applicant: Pixar, Emeryville, CA (US)

(72) Inventor: Florian Hecht, Berkeley, CA (US)

(73) Assignee: PIXAR, Emeryville, CA (US)

( * ) Notice: Subject to any disclaimer, the term of this patent is extended or adjusted under 35 U.S.C. 154(b) by 123 days.

(21) Appl. No.: 14/192,739

(22) Filed: Feb. 27, 2014

(51) Int. Cl.
*G06T 17/00* (2006.01)
*G06T 15/08* (2011.01)
*G06T 15/60* (2006.01)

(52) U.S. Cl.
CPC ............... *G06T 15/08* (2013.01); *G06T 15/60* (2013.01)

(58) Field of Classification Search
None
See application file for complete search history.

(56) References Cited

U.S. PATENT DOCUMENTS

2012/0182300 A1* 7/2012 Salvi ..................... G06T 15/08
345/426
2012/0212496 A1 8/2012 Kulla

* cited by examiner

*Primary Examiner* — Peter Hoang
(74) *Attorney, Agent, or Firm* — Kilpatrick Townsend & Stockton LLP

(57) ABSTRACT

Embodiments of the invention are directed to rendering scenes comprising one or more volumes viewed along a ray from a virtual camera. In order to render the one or more volumes, embodiments may first determine individual transmissivity functions for the one or more volumes. The individual transmissivity functions may be combined into a combined transmissivity function for the scene. The combined transmissivity function may be used to generate a cumulative density function (CDF) for the scene. The CDF may be sampled in order to determine a plurality of points along the ray. A contribution to a pixel may be determined for each sampled point. The contributions associated with the sampled points may be combined to determine a combined contribution to the pixel.

20 Claims, 10 Drawing Sheets

```
701    CI = 0; // cumulative importance starts at zero
702    for V in VOLUMES {
703       for i in march through V {
704          t_i; // the starting depth of the current segment
705          ds = t_(i+1) - t_i; // length of this segment
706          T = LookUpCombinedTransmissivityToDepth(t_i);
707          sigma_s = ComputeScatteringCoefficient(t_i);
708          sigma_e = ComputeExtinctionCoefficient(t_i);
709          dT = e^{-sigma_e * ds}; // change in transmissivity over the current segment
710          I = T * sigma_s * ((1.0 - dT) / sigma_e);
711          CI += I;
712          RecordOnCDF(t_i, CI);
713       }
714    }
```

*FIG. 7*

RENDERING OF MULTIPLE VOLUMES

The present invention relates generally to computer animation and graphics, and more particularly to techniques for efficient rendering of multiple volumetric objects.

BACKGROUND

Volumes (i.e., volumetric objects) are often used in computer animation to represent a distribution of particles in three-dimensional space. Volumes may be used to represent, for example, dust, smoke, and fire. Typically, volumes comprise a plurality of voxels (volumetric elements) arranged in a 3D grid. A volume in a scene may be defined by the bounds of the volume (e.g., using a 3D surface), the characteristics of voxels comprising the volume, and the positional distribution of voxels.

Scenes with volumes may pose a challenge to rendering engines. For example, a part of the volume closer to a virtual camera may restrict light travelling from a part of the volume farther from the camera. In addition, parts of the volume may be illuminated to differing extents depending on the position of light sources. Further, the volume may be heterogeneous; for example, different parts of the volume may have different transmissivity and scattering characteristics. Rendering engines may need to take these factors in account to produce a realistic image.

Scenes with multiple volumes may be particularly challenging. For example, one volume may appear behind another, or two or more volumes may overlap in space. Thus, some rendering engines may need to keep all volumes in a scene in memory simultaneously. In addition, some rendering engines may need to fully re-render the scene if any modifications are made to light sources. These problems are magnified in graphical processing unit (GPU) based rendering engines, where the available amount and bandwidth of memory may be limited.

Therefore, it is desirable to provide a method and system for the rendering of multiple volumes in an efficient manner.

BRIEF SUMMARY

Embodiments relate to rendering a scene comprising a first volume and a second volume viewed from a virtual camera. For example, a first transmissivity function associated with the first volume and a second transmissivity function associated with a second volume can be determined. Each transmissivity function may indicate a plurality of depth values along a ray from a pixel of the virtual camera. A combined transmissivity function may be determined using the first transmissivity function and second transmissivity function. A combined cumulative density function (CDF) may then be determined using the combined transmissivity function and scattering information for the volumes.

The combined CDF may include a first section corresponding to the first volume and a second section corresponding to the second volume. The first section may increase in value from zero at a first start of the first volume to a first value at a first end of the first volume, and the second section may increase from the first value at a second start of the second volume to a second value at a second end of the second volume. The combined CDF may be sampled using random values chosen from the codomain of the CDF to determine a plurality of points along the ray. For each sampled point, a shadow ray may be cast to determine a contribution to the pixel. The contributions to the pixel may be combined to determine a combined contribution to the pixel.

Other embodiments disclose systems comprising processors and memory configured to implement methods of rendering volumes. Other embodiments disclose a computer product comprising a non-transitory computer-readable medium storing code that causes one or more processors of a computer to implement methods of rendering volumes.

BRIEF DESCRIPTION OF THE DRAWINGS

FIG. 7 shows a method for generating a cumulative density function (CDF) of a scene comprising multiple volumes in accordance with some embodiments of the invention

DEFINITIONS

Figure 1:
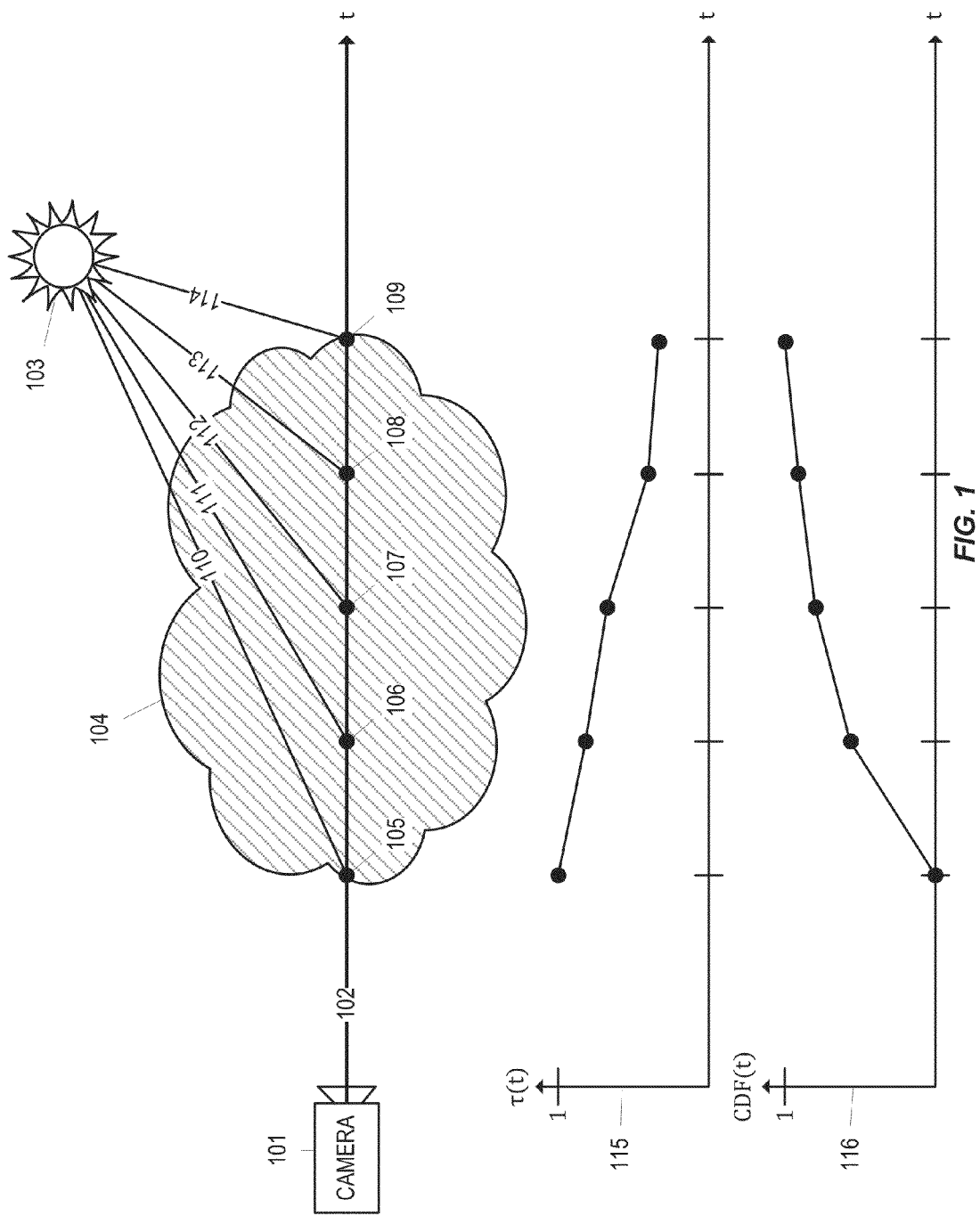
FIG. 1 shows a scene comprising a volume, an example of a transmissivity function for the scene, and example of a cumulative density function for the scene.

A "scene" may include any suitable computer representation of a plurality of graphical objects and their arrangement. Objects in the scene may each be associated with a location, a size, and an orientation in 3-dimensional space. For example, a scene may comprise various characters, inanimate objects, and terrain. In some cases, a scene may be divided into a plurality of layers (e.g., a foreground and a background), each of which may be independently rendered.

A "light source" may include any source of illumination for a scene. Light sources may be associated with a position in 3-dimensional space, an orientation, a brightness, a color distribution of light, or any other suitable characteristic. In some cases, a light source may emanate from a single point. In other cases, a light source may be distributed in multiple dimensions.

A "virtual camera" may include any virtual instrument or entity used to generate an image of a scene from a perspective or point-of-view. A virtual camera may comprise one or more pixels arranged in a two-dimensional grid. In some cases, a virtual camera may determine an image by tracing one or more rays from pixels of the virtual camera to a scene.

A "ray" may represent the path of virtual light from a scene to a virtual camera, or vice versa. In some cases, a ray may extend to an infinite distance from the virtual camera. In other cases, a ray may extend until a maximum opacity is reached. In yet other cases, the ray may extend for a fixed distance (e.g., a draw distance).

A "volume" or "volumetric object" may include any suitable computer representation of a diffuse distribution of particles or other objects throughout a three-dimensional space. In some cases, a "voxel" (volumetric element) may be used to represent the composition of the volume. The volume may be uniform (i.e., homogenous), or non-uniform (i.e., heterogenous).

The "transmissivity" of a medium (e.g., a volume or part of a volume) may include a measure of the amount or proportion of light along a ray that passes through the medium. For example, in some cases, the transmissivity may be measured by dividing the intensity of light that leaves a medium by the intensity of light that entered the medium. In some cases, transmissivity may be measured as a function of depth (i.e., the distance from a virtual camera).

A "transmissivity function" may include a function that represents the transmissivity at a plurality of depth values along a ray. For example, in some cases, in a homogenous medium, transmissivity may be calculated using the formula $\tau(t)=e^{-\alpha t}$, where $\tau$ is the transmissivity at a depth value of t from a virtual camera, and $\alpha$ is an attenuation coefficient of the medium.

A "scattering coefficient" may include a measure of the amount or proportion of light scattered from incident light sources to the direction of a virtual camera. The scattering coefficient may be a uniform property of a volume, or may vary depending on location and position within a volume.

A "cumulative density function" (CDF) may include any relation that describes the relative importance of a depth value along a ray in determining a contribution to a pixel viewed at a virtual camera. In some cases, the CDF may include multiple values for the same depth value (i.e., it may not be a mathematical function). A "normalized cumulative density function" (normalized CDF) may refer to a CDF whose maximum value is fixed.

A "shadow ray" may include a path of light from a light source to a point along a ray. In some cases, a shadow ray may start from a random point on the light source. Alternatively, the for light sources with a non-uniform distribution of light, the starting location of the shadow ray may be chosen depending on the relative luminosity of points on the light source. A shadow ray may be used to determine the amount of light reaching the sampled point from the light source. This determination may depend on a variety of factors, such as the transmissivity of any volumes along the shadow ray and the presence of opaque objects between the light source and the sampled point.

DETAILED DESCRIPTION

Embodiments of the invention are directed to rendering scenes comprising one or more volumes viewed along a ray from a virtual camera. In order to render the one or more volumes, embodiments may first determine individual transmissivity functions for the one or more volumes. The individual transmissivity functions may be combined into a combined transmissivity function for the scene. The combined transmissivity function may be used to generate a cumulative density function (CDF) for the scene. The CDF may be sampled in order to determine a plurality of points along the ray. A contribution to a pixel may be determined for each sampled point. The contributions associated with the sampled points may be combined to determine a combined contribution to the pixel.

Some embodiments can generate the combined transmissivity function and CDF independently of any light sources in the scene. In many use cases, light sources may be adjusted multiple times for a scene. For example, in computer-generated animation, a lighting artist may try different light source positions and other characteristics to reach a desired appearance of a scene. Embodiments allow the combined transmissivity function and CDF for a scene to be reused even if lighting for the scene changes. Thus, embodiments can improve rendering speed and efficiency by avoiding re-iterating along a ray each time lighting changes for a scene. This may allow, for example, a lighting artist to interactively modify light sources to determine the ideal lighting for a scene.

Figure 8:
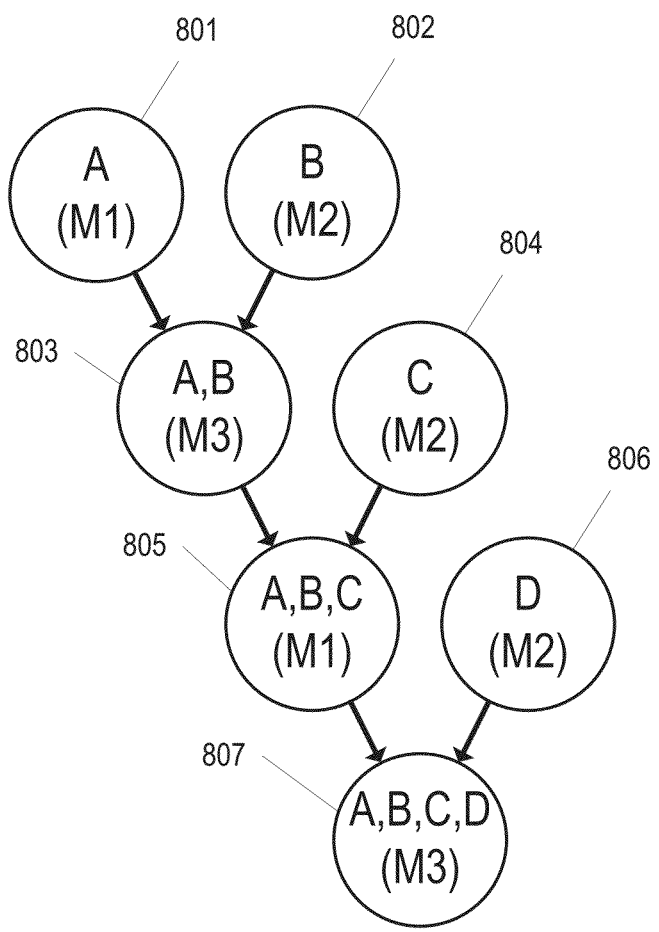
FIG. 8 shows a flow diagram illustrating a method for rendering an arbitrary number of volumes using three memory buffers.

Some embodiments can reduce the memory storage and bandwidth requirements needed for rendering a scene with multiple volumes. In one embodiment, a combined transmissivity function for any number of volumes may be determined by successively combining an individual transmissivity function with a partial combined transmissivity function. A combined CDF may be constructed in a similar iterative manner. One method for combining transmissivity functions and CDFs is shown in FIG. 8. Embodiments of the invention can allow rendering of scenes with multiple volumes on systems with a limited amount of memory or memory bandwidth. Reduced memory storage and bandwidth requirements may be especially advantageous in GPU-based rendering systems.

Further, some embodiments can allow rendering to be adjusted depending on the desired level of noise and detail. Analytic techniques for determining the transmissivity of volumes may be difficult or impossible in heterogeneous media. In contrast, embodiments of the invention allow for a combined transmissivity function and a CDF to be determined for a scene by sampling absorption and scattering characteristics at various depth values. In addition, the number of times a CDF is sampled may be adjusted. For example, a draft render of a scene by an animator may use a low number of samples, whereas a final render for a movie may use a high number of samples. Thus, embodiments of the invention allow a user scale the amount of processing used to render an image depending on the desired level of noise and detail.

The above examples highlight only a few of the advantages of rendering volumes in accordance with embodiments of the invention.

I. Introduction

FIG. 1 shows a scene comprising a light source 103 and a volume 104. Volume 104 occupies the shaded region shown. A user may desire to generate an image of the scene. Accordingly, the user may position and orient a virtual camera 101. A ray 102 corresponding to a pixel in virtual camera 101 is then projected. Ray 102 travels through volume 104. The horizontal axis corresponds to a depth from camera 101.

In order to determine the value (which may include the color, intensity, depth, or any other suitable characteristic) of a pixel corresponding to ray 102, a transmissivity function 115 is first determined as a function of depth value t along ray 102. The transmissivity function may be determined using any suitable method. For example, an absorption coefficient $\sigma_a$ may be measured at various points 105-109 along the ray 102. A transmissivity function 115 may then be determined by applying the Beer-Lambert law or another formula. Transmissivity function 115 indicates the proportion of light that reaches virtual camera 101 from each sampled point. For example, at point 105, transmissivity is 1, indicating that 100% of light from point 105 reaches virtual camera 101.

However, at point 109, transmissivity is significantly less than one, indicating that only a fraction of the light from the point 109 reaches virtual camera 101.

After calculating the transmissivity function 115, a cumulative density function (CDF) 116 that indicates the importance or relative contribution of each depth value t along ray 102 may be determined. In some cases, the contribution of a depth value t may be proportional to the transmissivity at that depth value (i.e., τ(t)), because a greater transmissivity indicates that a greater amount of light from that point is visible at virtual camera 101. The contribution of a depth value t may also be proportional to the scattering coefficient $\sigma_s(t)$ at that depth value, because a greater scattering coefficient indicates that a greater proportion of light reaching the point will be reflected toward virtual camera 101. This relationship between transmissivity, scattering, and importance is reflected in CDF 116. As shown, the greatest slope in CDF 116 (indicating a high importance) is between points 105 and 106, where transmissivity is highest. The slope of CDF 116 subsequently decreases as transmissivity decreases (e.g., at points 107-109), indicating a reduced importance of depth values near those points. In addition, as shown, CDF 116 may be normalized to have a codomain of the interval between 0 and 1.

In order to determine a final value of a pixel corresponding to ray 102, CDF 116 may be sampled (e.g., randomly or pseudo-randomly) a plurality of times using various values chosen from the codomain of the CDF. These values may be used to determine points along the ray for sampling. Once these points are determined, shadow rays 110-114 may be cast to light sources to determine the contribution of the points to the pixel value.

In some cases, a scene may include multiple volumes. In some instances, each volume may be heterogeneous, and each may have different absorption characteristics than other volumes. If two or more volumes overlap at a depth value of a ray, the transmissivity at the depth value may depend on both volumes. In addition, if a volume appears behind another volume on a ray, the transmissivity at points within the volume may depend on the volume that appears closer to a virtual camera. Furthermore, when multiple volumes overlap at a depth value, the CDF may need to incorporate scattering and emission information for each volume at the depth value. Accordingly, when sampling a CDF to determine a point along the ray, it may be necessary to distinguish between multiple overlapping volumes that occupy that point.

Embodiments can address these issues by providing systems and methods for rendering scenes with multiple volumes.

II. Rendering of Multiple Volumes

Figure 2:
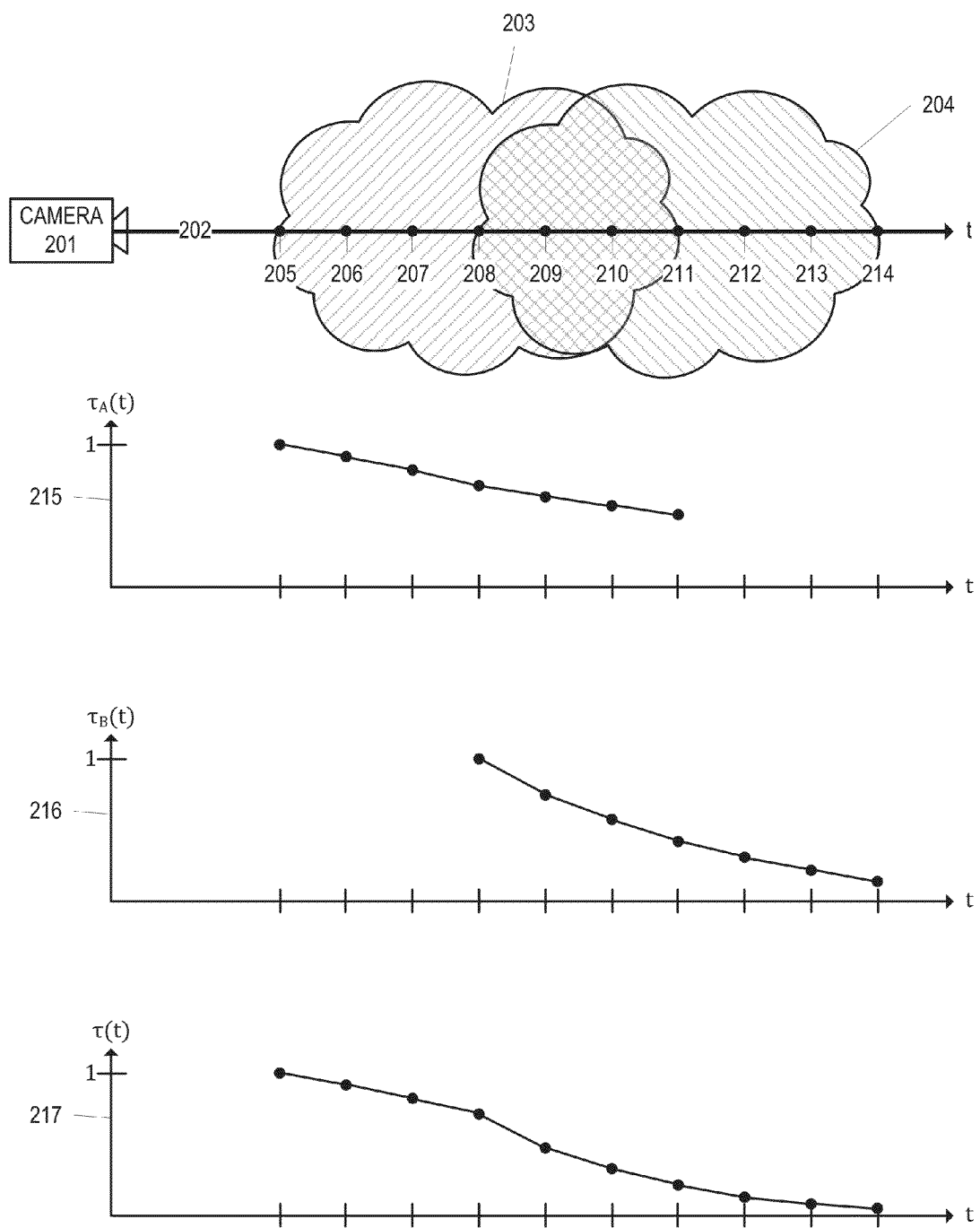
FIG. 2 shows a scene comprising two volumes, a transmissivity function for a first volume in the scene, a transmissivity function for a second volume in the scene, and a combined transmissivity function for the scene.

To render a scene comprising multiple volumes, embodiments may first determine the transmissivity functions for each volume independently. For example, FIG. 2 shows a scene comprising two volumes, a volume A 203 and a volume B 204. A virtual camera 201 may project a ray 202 into the scene. Embodiments may separately determine transmissivity functions for each of volume A 203 and volume B 204. One example of a transmissivity function A 215 is shown for volume A 203. Transmissivity function A 215 is shown for depth values 205-211 corresponding to the bounds of volume A 203. Similarly, transmissivity function B 216 is shown for volume B 204. Transmissivity function B 216 is shown for depth values 208-214 corresponding to the bounds of volume B 204.

In order to determine a transmissivity function for the scene, transmissivity function A 215 and transmissivity function B 216 may be combined. Combined transmissivity function 217 shows one example of a transmissivity function determined from functions A 215 and B 216. Accordingly, combined transmissivity function 217 is shown for all of depth values 205-214.

Once a combined transmissivity function for a scene has been determined, the combined transmissivity function may be used with scattering information to determine a cumulative density function (CDF) for each volume. The CDF may be constructed using an importance metric at a plurality of depth values along ray 202. In some embodiments, the importance metric may be the product of the transmissivity at a depth value and a scattering coefficient at the depth value. In scenes with multiple volumes, the importance metric may be calculated separately for each volume.

Figure 3:
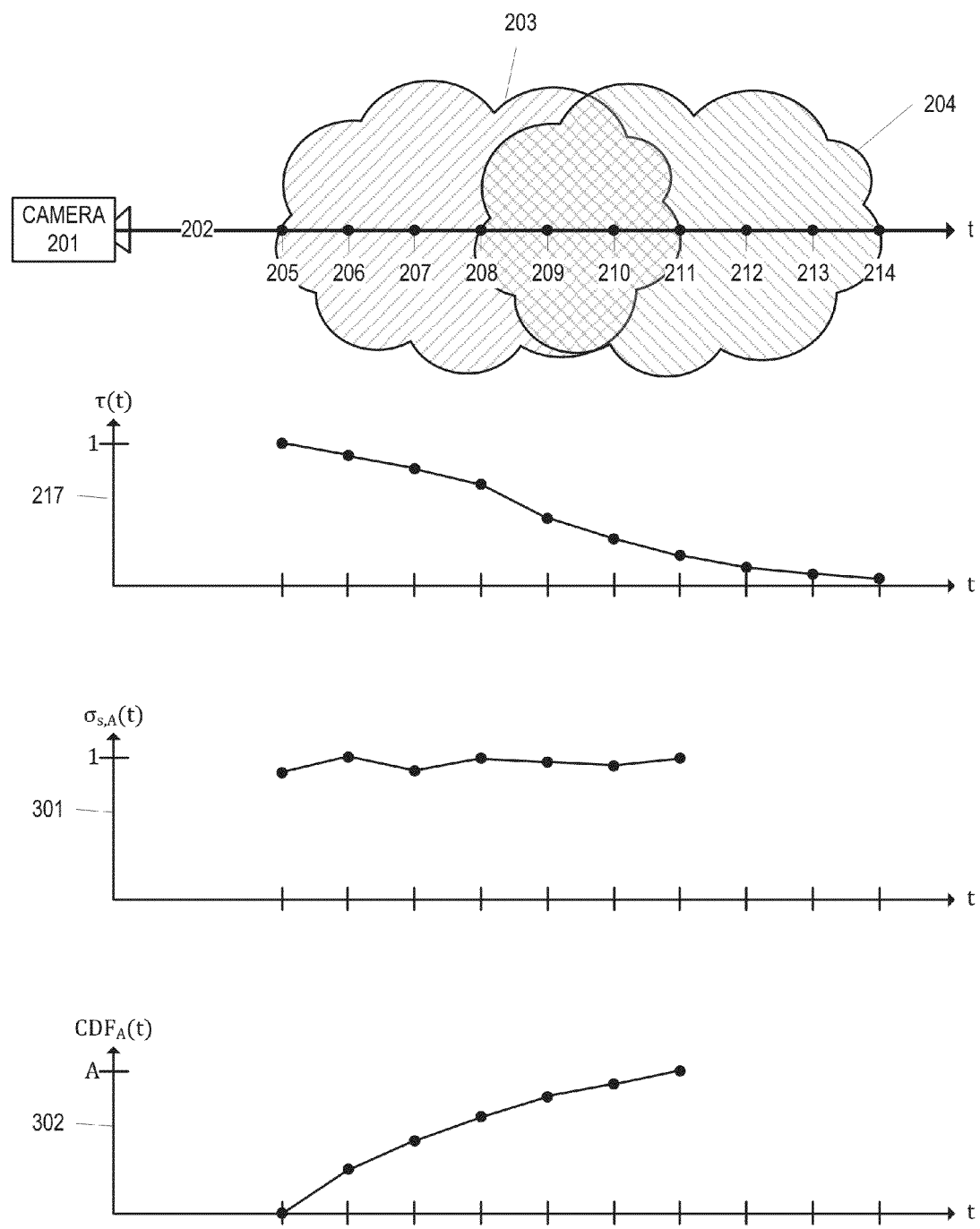
FIG. 3 shows a scene comprising two volumes, a combined transmissivity function for the scene, a scattering function for a first volume in the scene, and a cumulative density function for the first volume.

FIG. 3 shows the scene comprising volume A 203 and volume B 204, viewed by virtual camera 201 projecting a ray 202. FIG. 3 shows combined transmissivity function 217 for the scene. FIG. 3 also shows a scattering function A 301 for volume A 203. The scattering function A 301 may include scattering information, such as a scattering coefficient, for various depth values 205-211 corresponding to the bounds of volume A 203.

A CDF A 302 for volume A 203 may be determined using combined transmissivity function 217 and scattering function A 301. In some embodiments, the CDF A 302 may be determined iteratively, such as by successively adding an importance measure calculated at each of depth values 205-211. The importance measure may be, for example, proportional to the product of the transmissivity and the scattering coefficient at each depth value. Thus, CDF A 302 may have a value of zero at depth value 205, and may monotonically rise to a maximum value of "A" at depth value 211. The slope at each depth value of the CDF A may represent the importance or contribution of the depth value in relation to all light travelling along ray 202. Accordingly, the CDF may be sampled to determine a contribution to the pixel.

Figure 4:
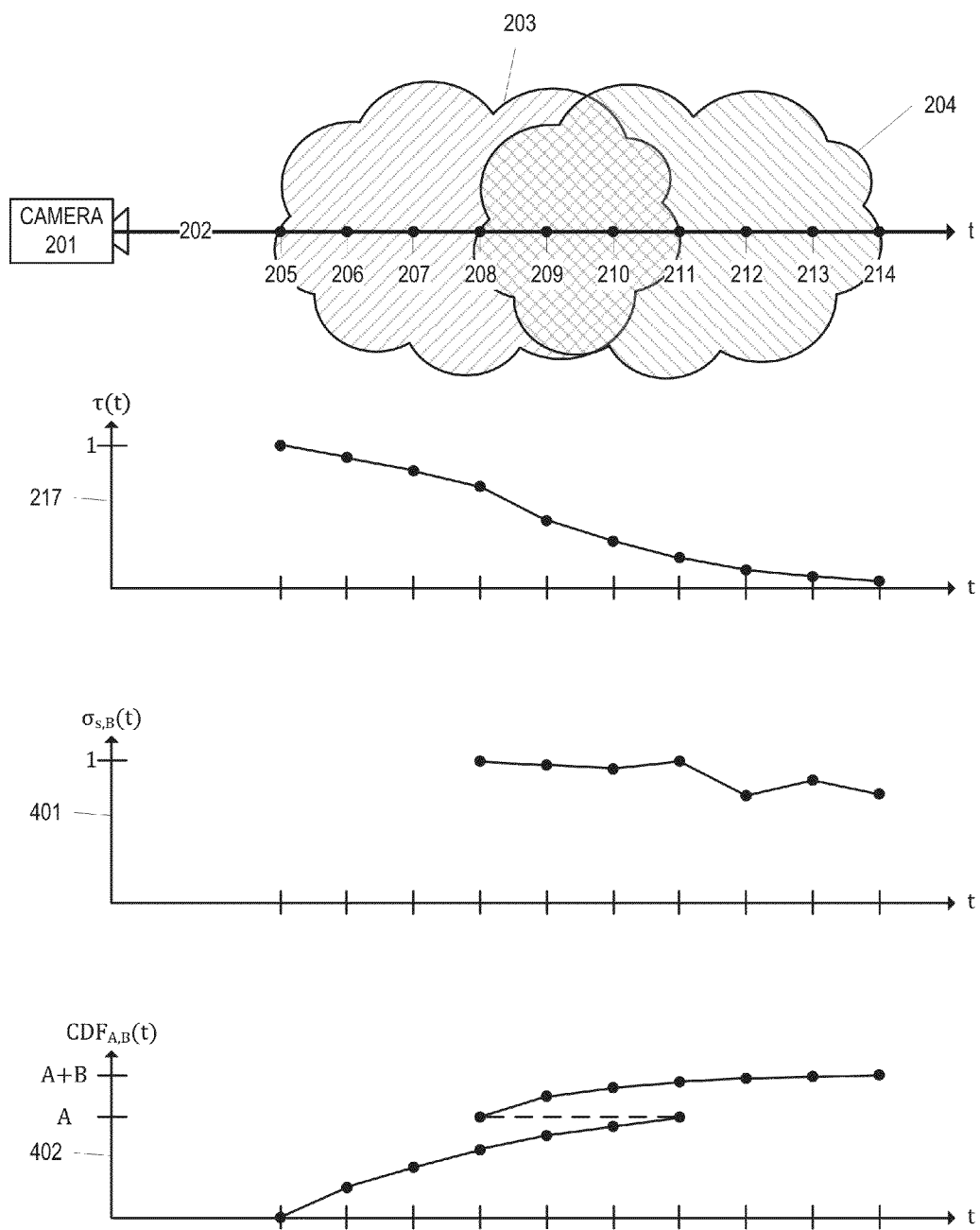
FIG. 4 shows a scene comprising two volumes, a combined transmissivity function for the scene, a scattering function for a second volume in the scene, and a combined cumulative density function for the scene.

CDFs for other volumes may be determined in a similar manner to CDF A 302. For example, FIG. 4 shows the scene comprising volume A 203 and volume B 204. FIG. 4 shows combined transmissivity function 217 for the scene, and a scattering function B 401 for volume B 204. The scattering function B 401 may include scattering information, such as a scattering coefficient, for various depth values 208-214 corresponding to the bounds of volume B 204.

A CDF B (not shown) for volume B 204 may be computed in a similar manner to CDF A 317 as shown in FIG. 3. CDF B may be defined for depth values 208-214, corresponding to the bounds of volume B 204. The maximum value "B" of CDF B may be determined.

A combined CDF 402 for the scene may be determined using CDF A 302 and CDF B. In some embodiments, the combined CDF 402 may be constructed by combining the CDFs of each volume, so that the starting value of each CDF is offset on the vertical axis by the maximum value of a previous CDF. For example, the combined CDF 402 may include CDF A 302 with its original domain comprising depth values 205-211, and its original codomain comprising the interval between 0 and A. Combined CDF 417 may also include CDF B with its original domain comprising depth values 208-214, but with an offset codomain comprising the interval between A and A+B. In some cases, a combined CDF may be normalized so that the maximum value is 1. For example, combined CDF 402 may be divided by A+B to constrain the codomain of the CDF to the interval between 0 and 1.

Once a combined CDF is determined for the scene, a process of importance sampling may be performed.

Figure 5:
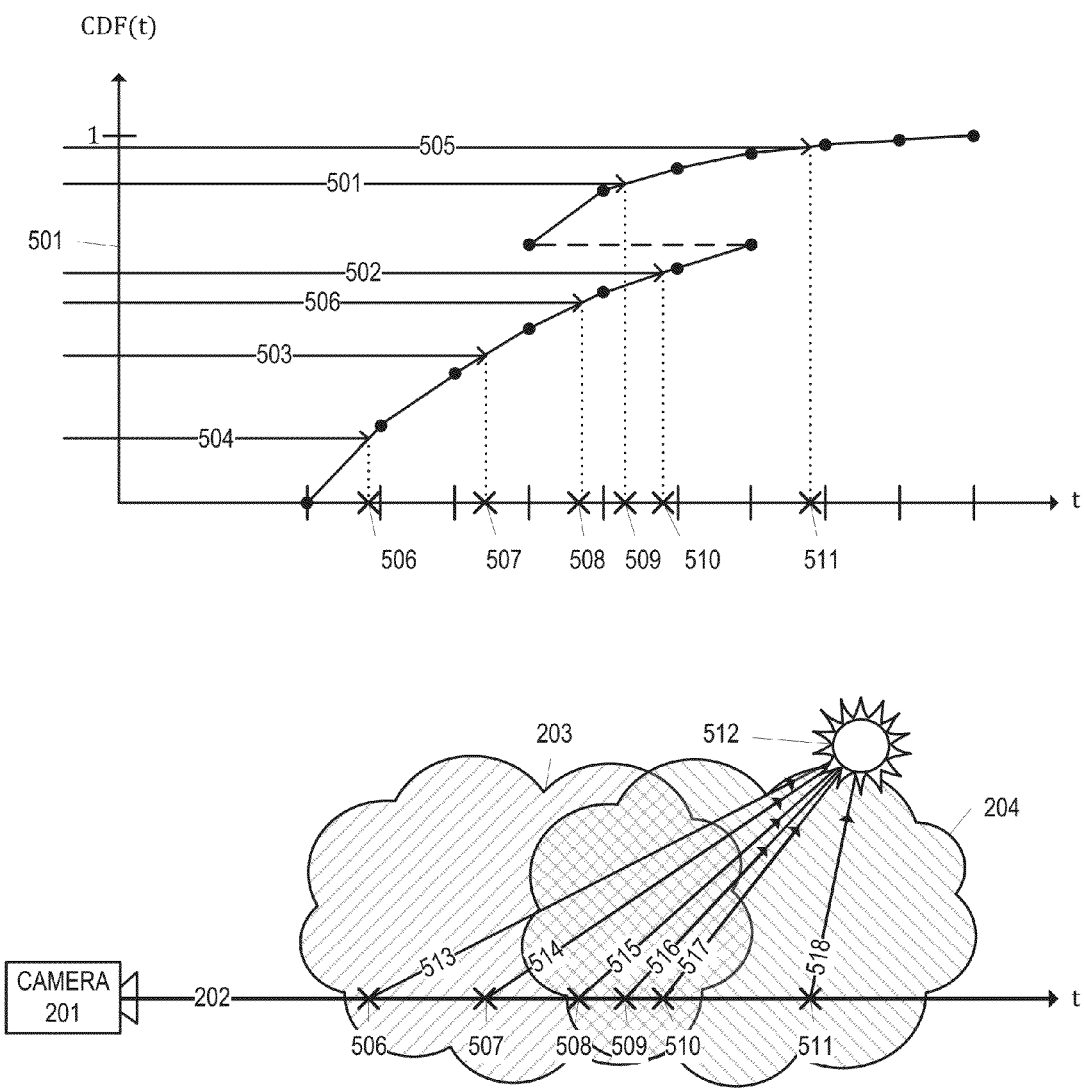
FIG. 5 shows a diagram illustrating the sampling of a cumulative density function.

FIG. 5 shows a diagram illustrating the sampling of a normalized combined CDF 501 at a plurality of CDF values 501-506. As shown, the sampled values may be chosen in any order, and using in any suitable manner. For example, the sampled values may be generated by a random or pseudo-random algorithm. For each CDF value, the combined CDF may be used to determine a corresponding depth value along ray 202, as indicated by the dotted lines in FIG. 5. Accordingly, a plurality of sampled points 506-511 along ray 202 may be determined. In addition, for each sampled point 506-511, a corresponding volume associated with the point may be determined depending on the part of the CDF that was sampled. For example, sampled point 501 may be associated with volume 204, and sampled point 502 may be associated with volume 203.

For each sampled point 506-511, a corresponding shadow ray 513-518 may be cast to each light source 512 in the scene. The shadow ray may be used to determine the amount of light reaching the sampled point from the light source. This determination may depend on a variety of factors, such as the transmissivity of any volumes along the shadow ray and the presence of opaque objects between the light source and the sampled point.

The amount of light reaching a sampled point, the scattering coefficient of the corresponding volume at the sampled point, and the transmissivity from the sampled point to virtual camera 201 may be used to determine an overall importance or contribution of the sample to the pixel corresponding to ray 202. Accordingly, the contributions of each of sampled points 506-511 may be combined to determine a combined contribution to the pixel.

III. Volume Rendering Methods

Figure 6:
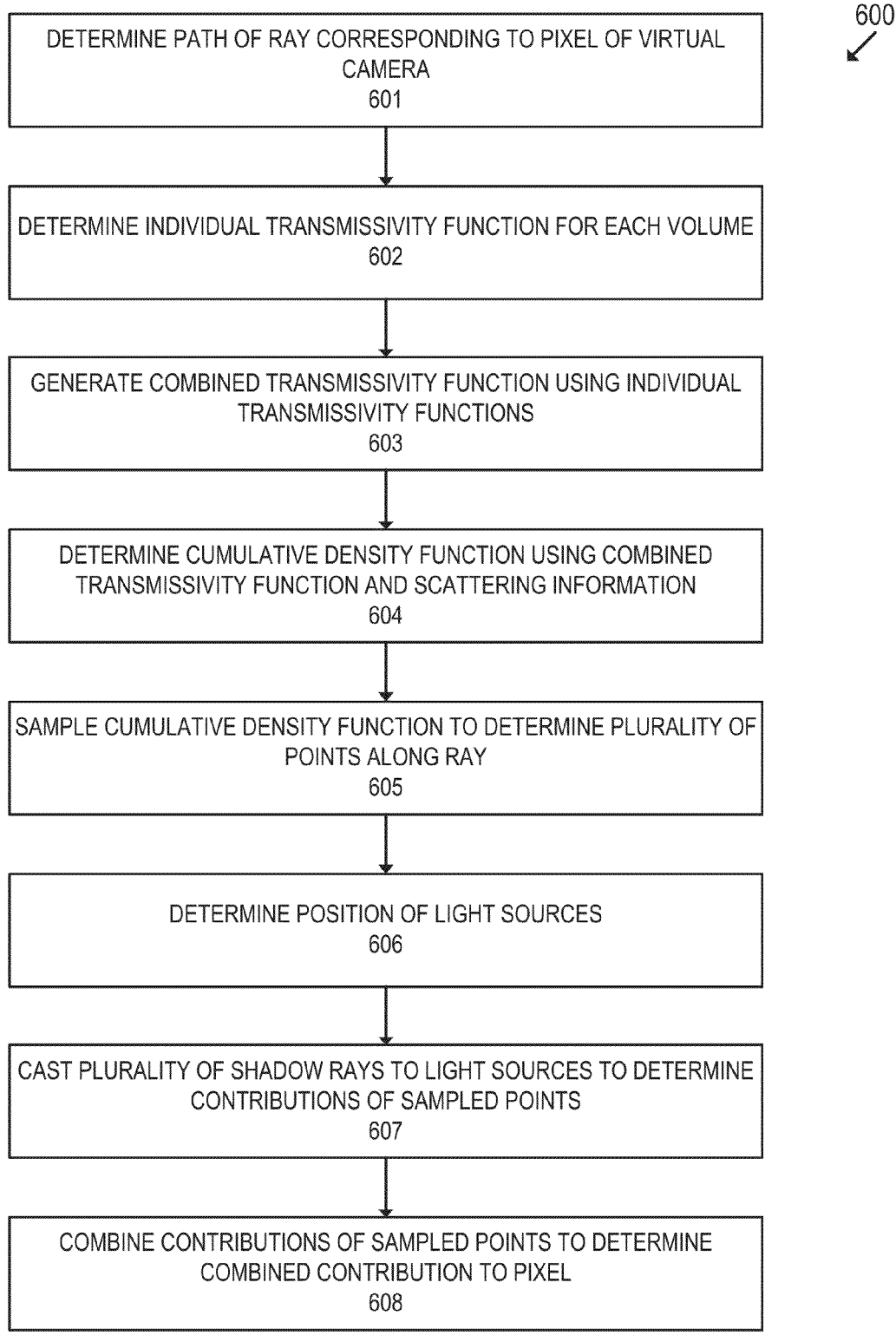
FIG. 6 shows a method for rendering a scene comprising multiple volumes.

FIG. 6 shows a method 600 for rendering a scene comprising multiple volumes. All or some of the blocks can be performed by a computer system, including various subcomponents of a computer system.

At block 601, a path of a ray corresponding to a pixel of a virtual camera is determined. The path of the ray may be determined using any suitable method. For example, a two-dimensional grid may be placed a distance in front of the virtual camera. The grid may comprise one or more cells, each cell representing a pixel in a rendered image. For each cell, a ray may be generated originating at the virtual camera and passing through the cell. In various embodiments, the ray may terminate at a fixed distance (e.g., a draw distance), may terminate once the ray reaches an opaque object, or may continue for an infinite length.

At block 602, an individual transmissivity function $\tau(t)$ is determined for each volume, where t is a depth value along the ray, and $\tau(t)$ indicates the proportion of light from the depth value reaching the virtual camera. In some embodiments, the transmissivity function may be calculated by dividing the volume into one or more segments along the ray, and sampling extinction information for the volume at the segments. Extinction information may include any information relating to the amount of light absorbed by a volume or scattered by the volume away from the virtual camera. Extinction information may depend on material characteristics of the volume such as the composition and characteristics of particles in the volume, the density of particles in the volume, and the motion of particles in the volume. In various embodiments, extinction information may include an extinction coefficient at a part of a volume, an absorption coefficient at the part of the volume, a scattering coefficient at the part of the volume, or any other suitable measure.

Once absorption information for the segments of the volume is determined, the transmissivity of all segments up to a depth value t may be multiplied to determine the value of the transmissivity function at t.

For example, in some embodiments, the transmissivity function from a depth value of 0 (i.e., at the virtual camera) to a depth value of t may be expressed as $\tau(0,t)=\Pi_{i=1}^{n}\tau(t_{i-1},t_i)$, where $\tau(0,t)$ is the transmissivity of a volume divided into n segments, where $t_{i-1}$ is the start of segment i, $t_i$ is the end of segment i, $t_0=0$, and where $t_n=t$. In volumes obeying the Beer-Lambert law, transmissivity may be expressed as $\tau(t_{i-1}, t_i)=e^{-\sigma_{a,i} \times (t_i - t_{i-1})}$, where $\sigma_{a,i}$ is the absorption coefficient of segment i. The absorption coefficient $\sigma_{a,i}$ may be determined in any suitable manner. For example, $\sigma_{a,i}$ may be the absorption coefficient at depth value $t_{i-1}$, the absorption coefficient at depth value $t_i$, an average absorption coefficient throughout the segment, or the absorption coefficient at a randomly chosen depth value in the segment.

For depth values outside the bounds of a volume, the absorption coefficient $\sigma_a$ may be 0, indicating that no light is absorbed. Thus, at depth values in front of a volume, an individual transmissivity function for the volume may have a value of 1. Analogously, at depth values behind a volume, an individual transmissivity function for the volume may have a constant value.

FIG. 2 shows an example of a transmissivity function A 215 for a volume A 203, and a transmissivity function 216 for a volume B 204. For clarity, the values of the individual transmissivity function outside the bounds of the corresponding volume are not shown.

At block 603, the individual transmissivity functions for the volumes are combined to generate a combined transmissivity function. In some embodiments, combining individual transmissivity functions may involve multiplying the individual transmissivity functions. For example, a scene may comprise a volume A with transmissivity function $\tau_A(t)$, and a volume B with a transmissivity function $\tau_B(t)$. In some embodiments, a combined transmissivity function from a depth value of 0 (i.e., at the virtual camera) to a depth value of t may be expressed as $\tau(0,t)=\tau_A(t) \times \tau_B(t)$. More generally, a combined transmissivity function for a scene comprising n volumes along a ray may be expressed as $\tau(t)=\Pi_{i=1}^{n}\tau_i(t)$, where $\tau_i(t)$ is the transmissivity of the ith volume at a depth value t.

One example of a combined transmissivity function 217 is shown in FIG. 2. As shown, at depth values 205-207, combined transmissivity function 217 is the same as transmissivity function A 215 because the depth values 205-207 lie before volume B 204. At depth values 208-211 corresponding to the overlapping region of volumes A 203 and B 204, the combined transmissivity function is affected by the product of the transmissivity of the individual functions 215 and 216. Finally, at depth values 212-214 corresponding to volume B 204, is only affected by transmissivity function B 216.

At block 604, a cumulative density function (CDF) is determined using the combined transmissivity function and scattering information associated with the volumes. The CDF may include any function that describes the relative importance of a depth value along a ray in determining a contribution to a pixel viewed at a virtual camera. In some embodiments, the CDF may be constructed by adding an importance value to a cumulative importance total for each of a plurality of steps $t_0, \ldots, t_i, \ldots t_n$ along the ray. Accordingly, in some embodiments, the CDF may be expressed as $$CDF(t) = \sum_{i=1}^{n} I(t_i),$$

where $I(t_i)$ is the value of an importance function at a depth $t_i$, where n is the number of steps, and where $t_n=t$.

In some embodiments, the importance function may be defined as $I(t)=\tau(t) \times$ $$\sigma_s(t) \times \left(1 - \frac{e^{\sigma_e(t) \times \Delta t}}{\sigma_e(t)}\right),$$

where $\tau(t)$ is the combined transmissivity at depth value t, $\sigma_s(t)$ is the scattering coefficient at the depth value t, $\Delta t$ is the step size, and $\sigma_e(t)=\sigma_s(t)+\sigma_a(t)$ is the extinction coefficient at the depth value t. However, in other embodiments, a different importance function may be used (e.g., if the lighting of the scene is used). The CDF for a volume may be calculated for the depth values that the volume occupies along the ray.

FIG. 3 shows an example of a CDF A 302 for a volume A 203 in accordance with some embodiments. As shown in FIG. 3, CDF A 302 may be determined using a combined transmissivity function 217, and a scattering coefficient function A 301 for volume A 203. CDF A 302 rises monotonically. However, the slope of CDF A 302 decreases as depth t increases. This may be because transmissivity decreases with depth in accordance with combined transmissivity function 217, whereas scattering function A 301 remains roughly the same. Thus, the importance value for each successive depth value reduces, resulting in a CDF with decreasing slope.

In cases where a scene comprises multiple volumes, the CDF may be generated by iterating through each volume successively. The importance value for each step in each volume may be added to a cumulative importance total. For each step, a point corresponding to the depth value of the step and the cumulative importance total may then be added to the CDF.

One method for calculating the CDF of a scene comprising multiple volumes in is shown in FIG. 7. Combined CDF 402 in FIG. 4 shows one example of a CDF associated with multiple volumes.

It should be noted that a CDF of a scene comprising multiple volumes may not be a mathematical function with respect to depth value t, since the CDF may have multiple values for the same depth value t. Rather, each CDF value may be associated both with a depth value t and a volume for which the value was determined.

At block 605, the CDF is sampled to determine a plurality of points along the ray. The CDF may be sampled in any suitable manner, such as by the generation of random or pseudo-random values in the codomain of the CDF. For example, if the CDF is normalized to have a codomain comprising the interval between 0 and 1, values between 0 and 1 may be generated.

For each generated value, a corresponding depth value on the CDF may be determined. For example, the inverse function of the CDF (i.e., $CDF^{-1}$) may be used to determine the depth value, or a binary search may be performed on the CDF to determine the depth value. The depth value may correspond to a point along the ray, and a volume occupying that point. More formally, for each value v determined, a corresponding sampled point along the ray t, where $CDF(t)=v$, may be determined.

At block 606, the positions and orientations of light sources in the scene are determined. A light source may include any source of illumination for the scene. The light sources may be placed in the scene by a user, automatically, or in any other suitable manner.

At block 607, a shadow ray is cast from each sampled point to the light sources in order to determine the contribution of the sampled point t. In some embodiments, the contribution of a sampled point t along the ray may be expressed as $C(t)=\tau(t) \times \sigma_s(t) \times \int L(t, \vec{i}) \times F(t, \vec{i}, \vec{o}) d\vec{i}$, where $\tau(t)$ is the combined transmissivity from t to the virtual camera, $\sigma_s(t)$ is the scattering coefficient corresponding to volume associated with the sampled point t, $\vec{i}$ is the incoming light direction, $\vec{o}$ is the outgoing direction, $L(t, \vec{i})$ is the amount of incoming light at t from the incoming light direction, and where $F(t, \vec{i}, \vec{o})$ is the phase function at t.

In order to determine the amount incoming light at sampled point t (i.e., $L(t, \vec{i})$), a shadow ray may be marched from a light source to the sampled point. Marching the shadow ray may be used to, for example, determine the transmissivity of volumes or other objects along the shadow ray between the light source and the sampled point. In some embodiments, a combined transmissivity of multiple volumes may be determined by multiplying individual transmissivity functions as described for block 603 above.

FIG. 5 shows an example of casting shadow rays in accordance with some embodiments of the invention. As shown in FIG. 5, a plurality of points 506-511 may be determined by sampling a CDF 501. For each sampled point 506-511, a shadow ray 513-518 is cast to light source 512. The shadow rays may pass through one or both of volumes 203 and 204. Accordingly, the amount of incoming light at each sampled point 506-511 may depend on the characteristics of the volumes 203 and 204, and the length of each shadow ray 513-518.

In scenes with multiple light sources, shadow rays from each light source to the sampled point t may be cast. Thus, an amount of incoming light from all directions, and the phase of the incoming light may be used to determine a contribution of the sampled point t. Alternatively, in some embodiments, a shadow ray may be cast from a random point on a randomly chosen light source. In such embodiments, only one shadow ray may need to be marched per sampled point. With an appropriate number of sampled points, the contribution of each light source will be captured.

At block 608, the contributions of the sampled points are combined to determine a combined contribution to the pixel of the virtual camera. The combined contribution may be determined in any suitable manner. In some embodiments, a combined contribution $C_{combined}$ may be expressed as the arithmetic mean of the contributions of all sampled points. For example, the combined contribution may be expressed as $$C_{combined} = \frac{1}{n} \sum_{i=1}^{n} C_i,$$

where n is the number of sampled points, and $C_i$ is the contribution of the ith sampled point. Each sampled point may also be associated with a color of light visible at the virtual camera, the position of the point in the scene, and other characteristics. These characteristics may be weighted by the contribution of each sampled point or any other factor to determine a combined characteristic (e.g., a final color as viewed by the virtual camera at the pixel, and a z-value for the pixel). Method 600 may be repeated for a plurality of pixels at the virtual camera to determine an image of the scene.

A. Cumulative Density Function Generation Methods

FIG. 7 shows a method for generating a cumulative density function (CDF) of a scene comprising multiple volumes in accordance with some embodiments of the invention. Typically, the method of FIG. 7 may be performed after a combined transmissivity function is determined for a scene. For example, the method of FIG. 7 may be performed during block 604 of method 600.

At line 701, a cumulative importance value (CI) is initialized to zero. The cumulative importance value (CI) may represent the value of the CDF as the method iterates through each volume and each depth value.

At line 702, a loop is defined to iteratively process each volume (V) in the scene. At line 703, each volume (V) may be divided into a plurality of segments (i), and a loop is defined to iterate through each segment.

At line 704, a starting depth (t_i) for the current segment is determined. Typically, the starting depth (t_i) may be a value representing the distance along a ray from the virtual camera to the start of the segment.

At line 705, a length of the segment (ds) is determined by subtracting the starting depth (t_i) of the segment from the starting depth of the next segment (t_(i+1)).

At line 706, a combined transmissivity value (T) at the starting depth (t_i) is determined. The combined transmissivity value may be computed, for example, in accordance with block 603 of method 600.

At line 707, a scattering coefficient (sigma_s) at the starting depth (t_i) is determined.

At line 708, a extinction coefficient (sigma_e) at the starting depth (t_i) is determined. Typically, the extinction coefficient at a depth value is the sum of the scattering coefficient (sigma_s) at the depth value and the absorption coefficient at the depth value.

At line 709, a change in transmissivity over the current segment (dT) is determined. The change in transmissivity (dT) may be calculated in accordance with the Beer-Lambert law, so that the change in transmissivity (dT) is e raised to the negated product of the extinction coefficient (sigma_e) and the length of the segment (ds).

At line 710, an importance of the segment (I) is determined. The importance (I) may be a product of the combined transmissivity value (T), the scattering coefficient (sigma_s), and (1−dT/sigma_e), which represents the integral of the change in transmissivity over the current segment.

At line 711, the cumulative importance value (CI) is incremented by the importance of the segment (I). Since the importance (I) is always positive, the cumulative importance value (CI) is monotonically increasing.

At line 712, the cumulative importance value (CI) is recorded on the CDF at the starting depth (t_i). Recording the cumulative importance value (CI) may include associating the depth (t_i) with the cumulative importance value (CI), and vice versa. In addition, the cumulative importance value may be associated with a volume (V) corresponding to the current iteration. If represented on an x-y graph, the cumulative importance value (CI) may represent a y-value, and the depth (t_i) may represent an x-value. In some embodiments, the CDF may be compressed, so that the cumulative importance value may not be recorded if it is determined to be redundant (e.g., very similar to the cumulative importance value for the previous depth value).

At line 713, iteration is continued for the next segment (i) in the volume (V). If a subsequent segment in the volume exists, the method proceeds to line 704. Otherwise, the method processes to line 714.

At line 714, iteration is continued for the next volume (V) in the scene. If a subsequent volume exists, the method proceeds to line 703. Otherwise, the method terminates.

After line 714, the recorded CDF represents the CDF for the scene. In some embodiments, the CDF may be normalized by dividing the CDF by the resulting CI value after line 714.

B. Efficient Volume Rendering Methods

As described in methods 600 and 700, rendering a scene comprising multiple volumes may involve generating a combined transmissivity function using individual transmissivity functions, and determining a CDF for multiple volumes. In some embodiments, the methods described above may be performed using a fixed amount of memory regardless of the number of volumes in a scene.

FIG. 8 shows a flow diagram illustrating a method for rendering an arbitrary number of volumes using three memory buffers. For illustrative purposes, the flow diagram is shown for a scene comprising four volumes: volume A, volume B, volume C, and volume D.

In order to generate a combined transmissivity function for a scene, embodiments may first generate individual transmissivity functions for each of the volumes in the scene. Next, embodiments may store an individual transmissivity function A 801 for volume A in memory buffer M1, and may store an individual transmissivity function B 802 for volume B in memory buffer M2. Embodiments may then combine individual transmissivity functions A 801 and B 802 by multiplying the functions 801 and 802 to determine a combined transmissivity function AB 803. Combined transmissivity function AB 803 may be stored in memory buffer M3.

Once combined transmissivity function AB 803 is determined, memory buffers M1 and M2 may be cleared. Next, individual transmissivity function C 804 for volume C may be stored in memory buffer M2. A combined transmissivity function ABC 805 may then be determined by multiplying combined transmissivity function AB 803 with individual transmissivity function C 804. The combined transmissivity function ABC 805 may be stored in memory buffer M1.

Once combined transmissivity function ABC 805 is determined, memory buffers M2 and M3 may be cleared. Next, individual transmissivity function D 806 for volume D may be stored in memory buffer M2. Next, individual transmissivity function D 806 and combined transmissivity function ABC 805 may be multiplied to determine combined transmissivity function ABCD 807, which may be stored in memory buffer M3.

In the above manner, a combined transmissivity function may be determined that incorporates any number of volumes in a scene. Determining the combined transmissivity function only needs three memory buffers: two buffers to store individual or partially combined transmissivity functions, and a buffer to store the combination of the two transmissivity functions to be combined.

The CDF for a scene may be determined in a similar manner, wherein the CDF may occupy a first memory buffer, and the combined transmissivity function may occupy a second memory buffer. The third memory buffer may be unused or used for a different purpose. As each volume is processed, scattering coefficient at a depth value may be determined and used to calculate an importance value for the depth value. The importance value may then be appended to the CDF.

Thus, embodiments of the invention enable rendering of systems with a limited amount of memory or memory bandwidth.

IV. Additional Embodiments

It should be noted that although embodiments are described in relation to the above methods, embodiments are not so limited. In some embodiments, further optimizations may be performed for scenes comprising a single volume. In some embodiments, in such scenes, the cumulative transmissivity function and CDF may be determined concurrently. For example, once the combined transmissivity is determined for a depth value t, the importance for that depth value may be calculated and added to the CDF.

In addition, in some cases, some or all lighting sources may be known to be fixed in a scene before generation of the CDF for the scene. In such cases, in some embodiments, the importance metric may take into account the lighting of the scene. For example, in some embodiments, the importance value I for the CDF may be expressed as $I(t)=\tau(t) \times \sigma_s(t) \times$ $$\oint L(t, \vec{i}) \times F(t, \vec{i}, \vec{o}) d\vec{i} \times \left(1 - \frac{e^{\sigma_e(t) \times \Delta t}}{\sigma_e(t)}\right),$$

where $\tau(t)$ is the combined transmissivity from t to the virtual camera, $\sigma_s(t)$ is the scattering coefficient corresponding to volume associated with the sampled point t, $\vec{i}$ is the incoming light direction, $\vec{o}$ is the outgoing direction, L (t, $\vec{i}$) is the amount of incoming light at t from the incoming light direction, where F (t, $\vec{i}$, $\vec{o}$) is the phase function at t, and where $\Delta t$ is the step size.

In some embodiments, a pixel rendered for a scene may be associated with a depth value. The depth value may be determined in any suitable manner. For example, the depth value may be the arithmetic mean of the depth values of the sampled points used to determine contributions to the pixel. Alternatively, the depth value associated with the pixel may be the maximum of the depth values of the sampled points, or the minimum of the depth values of the sampled points. In some embodiments, the depth value of a rendered image of a scene may be determined from the depth values of the pixels comprising the image.

In other embodiments, a pixel rendered for a scene may be associated with a combined transmissivity function for the scene, such as a function generated at block 603 of method 600.

The depth values or combined transmissivity functions for the pixels and the image may be used for any suitable purpose, such as compositing multiple images (e.g., alpha compositing). For example, if a scene comprising one or more volumes is considered a background image, the background image may be composited with a foreground image using depth values or combined transmissivity functions associated with each image or pixels within each image.

In addition, in some embodiments, each ray may contribute to more than one pixel. For example, in some embodiments, a process such as image space filtering may be performed whereby a ray may contribute to a 2×2 grid of pixels.

V. System

Figure 9:
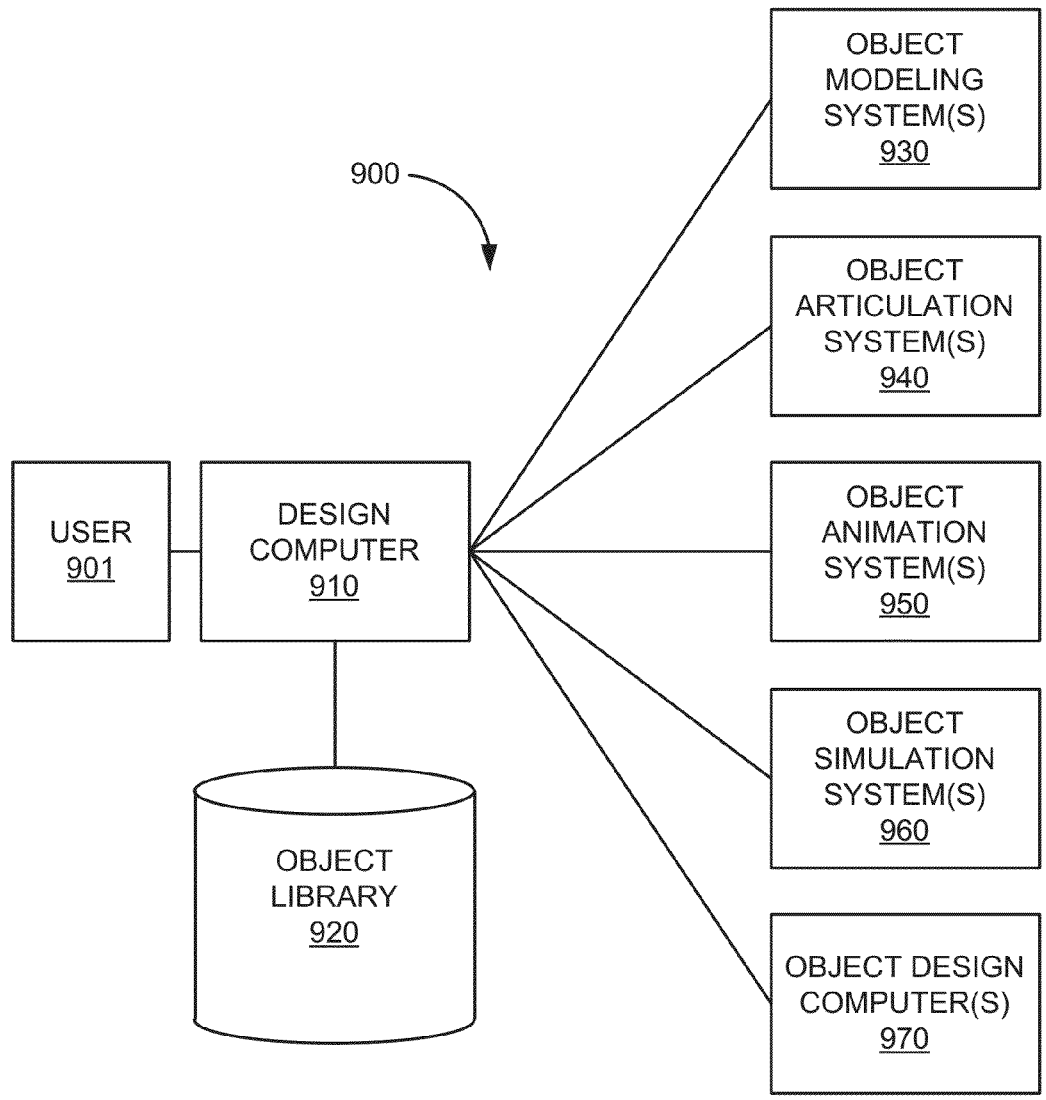
FIG. 9 shows a simplified block diagram of system for creating computer graphics imagery (CGI) and computer-aided animation that may implement or incorporate various embodiments of the invention.

FIG. 9 is a simplified block diagram of system 900 for creating computer graphics imagery (CGI) and computer-aided animation that may implement or incorporate various embodiments. In this example, system 900 can include one or more design computers 910, object library 920, one or more object modeler systems 930, one or more object articulation systems 940, one or more object animation systems 950, one or more object simulation systems 960, and one or more object rendering systems 970. Any of the systems 930-970 may be invoked by or used directly by a user of the one or more design computers 910 and/or automatically invoked by or used by one or more processes associated with the one or more design computers 910. Any of the elements of system 900 can include hardware and/or software elements configured for specific functions.

The one or more design computers 910 can include hardware and software elements configured for designing CGI and assisting with computer-aided animation. Each of the one or more design computers 910 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 910 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 910 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 910 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 910 acting as an animator may employ one or more systems or tools to specify motion and position of one or more objects over time to produce an animation.

Object library 920 can include elements configured for storing and accessing information related to objects used by the one or more design computers 910 during the various stages of a production process to produce CGI and animation. Some examples of object library 920 can include a file, a database, or other storage devices and mechanisms. Object library 920 may be locally accessible to the one or more design computers 910 or hosted by one or more external computer systems.

Some examples of information stored in object library 920 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 930 can include hardware and/or software elements configured for modeling one or more objects. Modeling can include the creating, sculpting, and editing of an object. In various embodiments, the one or more object modeling systems 930 may be configured to generated a model to include a description of the shape of an object. The one or more object modeling systems 930 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 930 may further generate model data (e.g., 2D and 3D model data) for use by other elements of system 900 or that can be stored in object library 920. The one or more object modeling systems 930 may be configured to allow a user to associate additional information, metadata, color, lighting, rigging, controls, or the like, with all or a portion of the generated model data.

The one or more object articulation systems 940 can include hardware and/or software elements configured to articulating one or more computer-generated objects. Articulation can include the building or creation of rigs, the rigging of an object, and the editing of rigging. In various embodiments, the one or more articulation systems 940 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 940 may further generate articulation data (e.g., data associated with controls or animations variables) for use by other elements of system 900 or that can be stored in object library 920. The one or more object articulation systems 940 may be configured to allow a user to associate additional information, metadata, color, lighting, rigging, controls, or the like, with all or a portion of the generated articulation data.

The one or more object animation systems 950 can include hardware and/or software elements configured for animating one or more computer-generated objects. Animation can include the specification of motion and position of an object over time. The one or more object animation systems 950 may be invoked by or used directly by a user of the one or more design computers 910 and/or automatically invoked by or used by one or more processes associated with the one or more design computers 910.

In various embodiments, the one or more animation systems 950 may be configured to enable users to manipulate controls or animation variables or utilized character rigging to specify one or more key frames of animation sequence. The one or more animation systems 950 generate intermediary frames based on the one or more key frames. In some embodiments, the one or more animation systems 950 may be configured to enable users to specify animation cues, paths, or the like according to one or more predefined sequences. The one or more animation systems 950 generate frames of the animation based on the animation cues or paths. In further embodiments, the one or more animation systems 950 may be configured to enable users to define animations using one or more animation languages, morphs, deformations, or the like.

The one or more object animations systems 950 may further generate animation data (e.g., inputs associated with controls or animations variables) for use by other elements of system 900 or that can be stored in object library 920. The one or more object animations systems 950 may be configured to allow a user to associate additional information, metadata, color, lighting, rigging, controls, or the like, with all or a portion of the generated animation data.

The one or more object simulation systems 960 can include hardware and/or software elements configured for simulating one or more computer-generated objects. Simulation can include determining motion and position of an object over time in response to one or more simulated forces or conditions. The one or more object simulation systems 960 may be invoked by or used directly by a user of the one or more design computers 910 and/or automatically invoked by or used by one or more processes associated with the one or more design computers 910.

In various embodiments, the one or more object simulation systems 960 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 960 may be used to simulate the behavior of objects, such as hair, fur, and cloth, in response to a physics model and/or animation of one or more characters and objects within a computer-generated scene.

The one or more object simulation systems 960 may further generate simulation data (e.g., motion and position of an object over time) for use by other elements of system 100 or that can be stored in object library 920. The generated simulation data may be combined with or used in addition to animation data generated by the one or more object animation systems 150. The one or more object simulation systems 960 may be configured to allow a user to associate additional information, metadata, color, lighting, rigging, controls, or the like, with all or a portion of the generated simulation data.

The one or more object rendering systems 970 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 970 may be invoked by or used directly by a user of the one or more design computers 910 and/or automatically invoked by or used by one or more processes associated with the one or more design computers 910. One example of a software program embodied as the one or more object rendering systems 970 can include PhotoRealistic RenderMan, or PRMan, produced by Pixar Animations Studios of Emeryville, Calif.

In various embodiments, the one or more object rendering systems 970 can be configured to render one or more objects to produce one or more computer-generated images or a set of images over time that provide an animation. The one or more object rendering systems 970 may generate digital images or raster graphics images.

In various embodiments, a rendered image can be understood in terms of a number of visible features. Some examples of visible features that may be considered by the one or more object rendering systems 970 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 970 may further render images (e.g., motion and position of an object over time) for use by other elements of system 900 or that can be stored in object library 920. The one or more object rendering systems 970 may be configured to allow a user to associate additional information or metadata with all or a portion of the rendered image.

Figure 10:
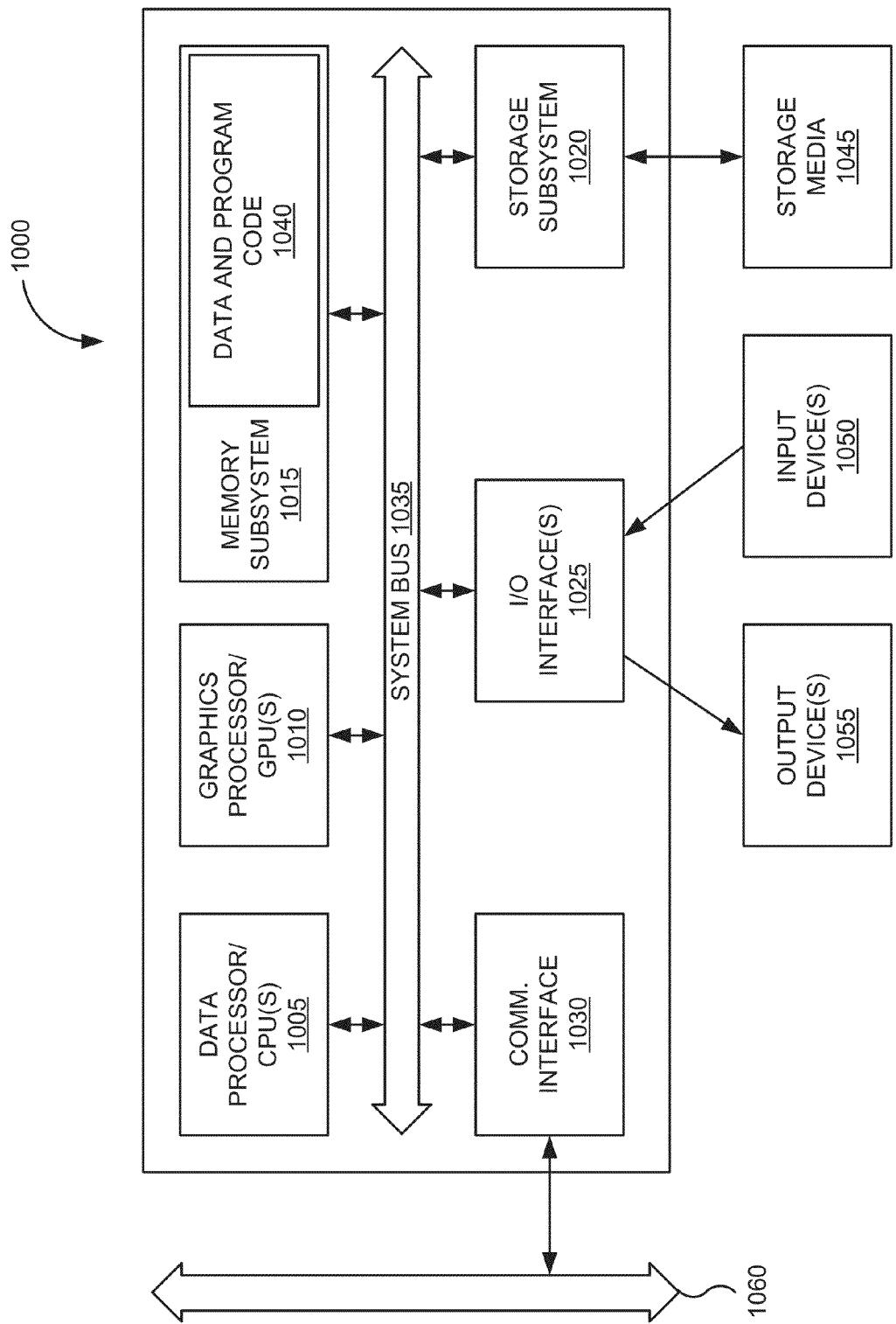
FIG. 10 shows a block diagram of a computer system according to some embodiments of the invention.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1060, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps, blocks, or lines. Thus, embodiments can be directed to computer systems configured to perform the steps, blocks, or lines of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects.

The above description of example embodiments has been presented for the purposes of illustration and description. It is not intended to be exhaustive or to limit the invention to the precise form described, and many modifications and variations are possible in light of the teaching above. The embodiments were chosen and described in order to best explain the principles and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of rendering a scene comprising a first volume and a second volume, the method comprising:
   determining a first transmissivity function associated with the first volume, wherein the first transmissivity function indicates a cumulative transmissivity of the first volume at a first plurality of depth values along a ray associated with a pixel;
   determining a second transmissivity function associated with the second volume, wherein the second transmissivity function indicates a cumulative transmissivity of the second volume at a second plurality of depth values along the ray;
   determining a combined transmissivity function using the first transmissivity function and the second transmissivity function, wherein the combined transmissivity function indicates a cumulative transmissivity of the first volume and the second volume at a third plurality of depth values along the ray;
   determining a cumulative density function using the combined transmissivity function, scattering information for the first volume, and scattering information for the second volume;
   sampling the cumulative density function to determine a plurality of points along the ray, wherein each point is associated with a depth value and a source volume;
   for each sampled point, casting a shadow ray to a light source to determine a contribution to the pixel;
   combining the determined contributions to the pixel for the sampled points; and
   determining a combined contribution to the pixel based on the combining.

2. The method of claim 1, wherein the cumulative density function is sampled based on random values chosen from the codomain of the cumulative density function.

3. The method of claim 1, wherein the cumulative density function includes a first section corresponding to the first volume and a second section corresponding to the second volume, the first section increasing from zero at a first start of the first volume to a first value at a first end of the first volume, the second section increasing from the first value at a second start of the second volume to a second value at a second end of the second volume.

4. The method of claim 1, wherein the contribution to the pixel of each sampled point is determined using a scattering coefficient associated with the source volume at the sampled point.

5. The method of claim 1, wherein the combined contribution to the pixel is an average of the contributions of each of the sampled points.

6. The method of claim 1, wherein the cumulative density function is determined using lighting information at the third plurality of depth values.

7. The method of claim 1, further comprising:
moving the light source to a different location;
further sampling the cumulative density function to determine a second plurality of points along the ray, wherein each point in the second plurality of points is associated with a depth value and a source volume;
for each sampled point in the second plurality of points, casting a shadow ray to the light source to determine a contribution to a second pixel; and
combining the contributions to the second pixel for the sampled points to determine a combined contribution to the second pixel.

8. The method of claim 1, wherein the first volume and the second volume are overlapping.

9. The method of claim 1, wherein the scene further comprises a third volume, wherein the method further comprises:
determining a third transmissivity function associated with the third volume, wherein the third transmissivity function indicates a cumulative transmissivity of the third volume at a fourth plurality of depth values along the ray, wherein the combined transmissivity function is determined using the third transmissivity function, and wherein determining the combined transmissivity function comprises:
determining a partial combined transmissivity function using the first transmissivity function and the second transmissivity function; and
determining the combined transmissivity function using the partial combined transmissivity function and the third transmissivity function.

10. The method of claim 9, wherein the combined transmissivity function is determined using three memory buffers.

11. A computer product comprising a non-transitory computer readable medium storing a plurality of instructions that when executed control a computer system to render a scene comprising a first volume and a second volume, the instructions comprising:
determining a first transmissivity function associated with the first volume, wherein the first transmissivity function indicates a cumulative transmissivity of the first volume at a first plurality of depth values along a ray associated with a pixel;
determining a second transmissivity function associated with the second volume, wherein the second transmissivity function indicates a cumulative transmissivity of the second volume at a second plurality of depth values along the ray;
determining a combined transmissivity function using the first transmissivity function and the second transmissivity function, wherein the combined transmissivity function indicates a cumulative transmissivity of the first volume and the second volume at a third plurality of depth values along the ray;
determining a cumulative density function using the combined transmissivity function, scattering information for the first volume, and scattering information for the second volume;
sampling the cumulative density function to determine a plurality of points along the ray, wherein each point is associated with a depth value and a source volume;
for each sampled point, casting a shadow ray to a light source to determine a contribution to the pixel;
combining the determined contributions to the pixel for the sampled points; and
determining a combined contribution to the pixel based on the combining.

12. The computer program product of claim 11, wherein the cumulative density function is sampled based on random values chosen from the codomain of the cumulative density function.

13. The computer product of claim 11, wherein the cumulative density function includes a first section corresponding to the first volume and a second section corresponding to the second volume, the first section increasing from zero at a first start of the first volume to a first value at a first end of the first volume, the second section increasing from the first value at a second start of the second volume to a second value at a second end of the second volume.

14. The computer product of claim 11, wherein the contribution to the pixel of each sampled point is determined using a scattering coefficient associated with the source volume at the sampled point.

15. The computer product of claim 11, wherein the combined contribution to the pixel is an average of the contributions of each of the sampled points.

16. The computer product of claim 11, wherein the cumulative density function is determined using lighting information at the third plurality of depth values.

17. The computer product of claim 11, further comprising:
moving the light source to a different location;
further sampling the cumulative density function to determine a second plurality of points along the ray, wherein each point in the second plurality of points is associated with a depth value and a source volume;
for each sampled point in the second plurality of points, casting a shadow ray to the light source to determine a contribution to a second pixel; and
combining the contributions to the second pixel for the sampled points to determine a combined contribution to the second pixel.

18. The computer product of claim 11, wherein the first volume and the second volume are overlapping.

19. The computer product of claim 11, wherein the scene further comprises a third volume, wherein the method further comprises:
determining a third transmissivity function associated with the third volume, wherein the third transmissivity function indicates a cumulative transmissivity of the third volume at a fourth plurality of depth values along the ray, wherein the combined transmissivity function is determined using the third transmissivity function, and wherein determining the combined transmissivity function comprises:
determining a partial combined transmissivity function using the first transmissivity function and the second transmissivity function; and
determining the combined transmissivity function using the partial combined transmissivity function and the third transmissivity function.

20. A computer comprising:
a processor; and
the computer product of claim 11.

* * * * *